(12) United States Patent
Floyd

(10) Patent No.: US 9,483,199 B1
(45) Date of Patent: Nov. 1, 2016

(54) DATA DEDUPLICATION USING MULTIPLE DEVICES

(71) Applicant: Permabit Technology Corporation, Cambridge, MA (US)

(72) Inventor: Jered J. Floyd, Somerville, MA (US)

(73) Assignee: Permabit Technology Corporation, Cambridge, MA (US)

( * ) Notice: Subject to any disclaimer, the term of this patent is extended or adjusted under 35 U.S.C. 154(b) by 104 days.

(21) Appl. No.: 14/462,263

(22) Filed: Aug. 18, 2014

(51) Int. Cl.
*G06F 12/00* (2006.01)
*G06F 3/06* (2006.01)
*G06F 13/00* (2006.01)
*G06F 13/28* (2006.01)

(52) U.S. Cl.
CPC .......... *G06F 3/0641* (2013.01); *G06F 3/0604* (2013.01); *G06F 3/067* (2013.01); *G06F 2003/0697* (2013.01)

(58) Field of Classification Search
CPC .... G06F 3/0641; G06F 3/0604; G06F 3/067; G06F 2003/0697
See application file for complete search history.

(56) References Cited

U.S. PATENT DOCUMENTS

| | | | | |
|---|---|---|---|---|
| 7,818,495 B2* | 10/2010 | Tanaka | ................. | G06F 3/0608 711/103 |
| 7,822,939 B1* | 10/2010 | Veprinsky | ............. | G06F 3/0608 711/161 |
| 7,908,436 B1* | 3/2011 | Srinivasan | ............ | G06F 3/0622 711/103 |
| 8,156,306 B1* | 4/2012 | Raizen | .................. | G06F 3/0608 707/813 |
| 8,281,066 B1* | 10/2012 | Trimmer | ............... | G06F 3/0641 711/103 |
| 2008/0122665 A1* | 5/2008 | Paris | ................... | G06F 12/0864 341/87 |
| 2015/0253999 A1* | 9/2015 | Nemazie | ............ | G06F 12/0246 711/103 |
| 2015/0363134 A1* | 12/2015 | Hironaka | ................ | G06F 3/061 711/118 |

\* cited by examiner

*Primary Examiner* — Mark Giardino, Jr.
(74) *Attorney, Agent, or Firm* — Fish & Richardson P.C.

(57) ABSTRACT

Among other things, a technique of data deduplication using multiple devices includes presenting, to host devices, a quantity of logical data storage greater than physical data storage available on a storage area network (SAN) device, by deduplicating at least some of the data received from the host devices for storage at the SAN device in a manner that is coordinated with over-provisioning capability of the SAN device.

17 Claims, 9 Drawing Sheets

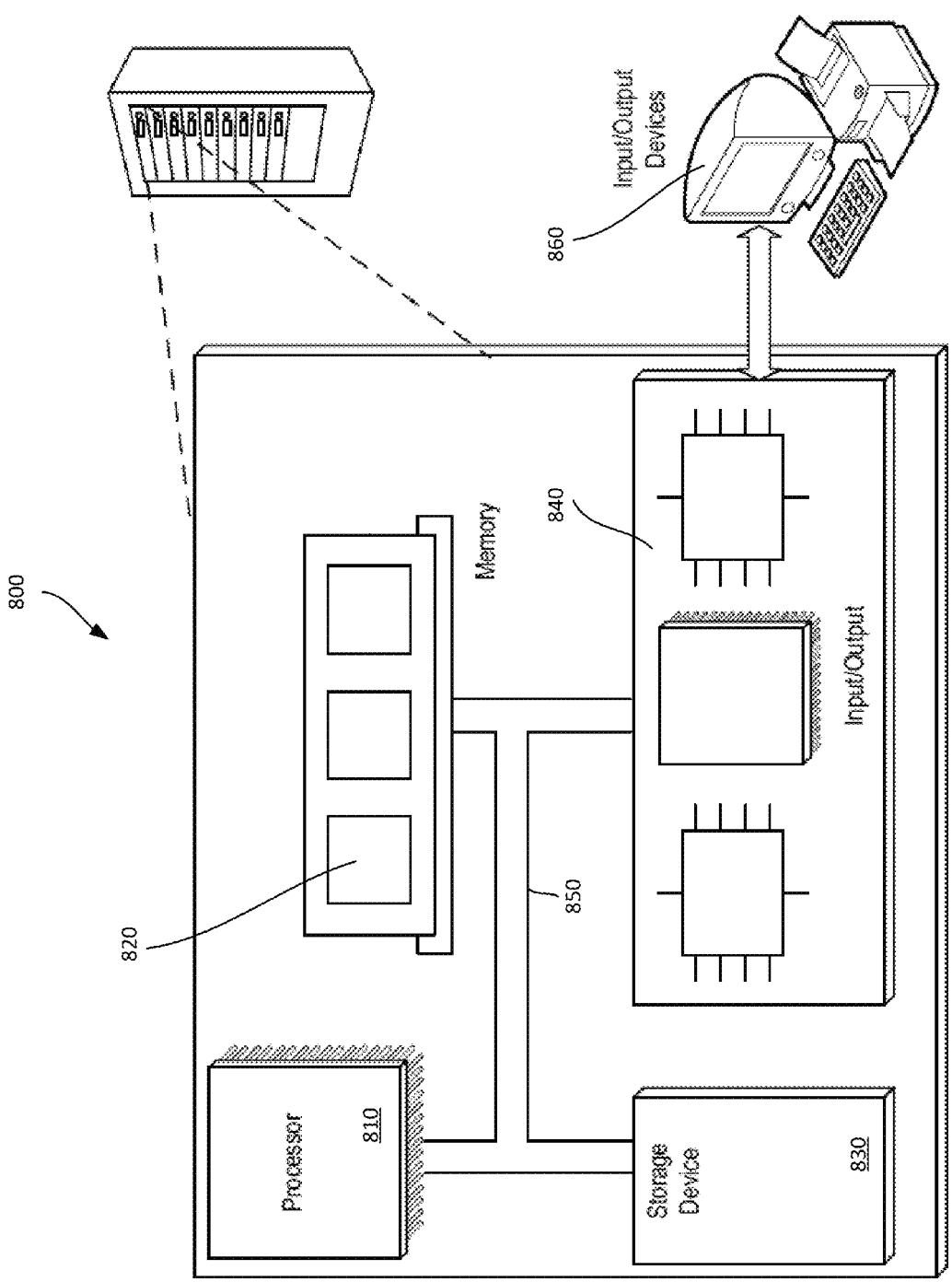

DATA DEDUPLICATION USING MULTIPLE DEVICES

BACKGROUND

This description relates to storing data in a data storage system. Computers can be used to store, access, and modify data within a data storage system.

SUMMARY

The systems and methods that we describe here may encompass one or more of the following (and other) aspects, features, and implementations, and combinations of them.

In a first aspect, a system for managing data-related requests between a host and a storage area network (SAN) device is configured to receive data describing a first set of logical units of the SAN device, the first set of logical units together representing a total quantity of logical data storage that is greater than a total quantity of physical data storage available on the SAN device, where at least some pages of the first set of logical units are not allocated to the physical data storage; present one or more second logical units to the host, wherein the second logical units correspond to one or more logical units of the first set of logical units; receive, from the host, a request to write data to a particular second logical unit, where the request identifies a portion of data and a location of the particular second logical unit; partition the particular portion of data into one or more blocks; create an index for the particular portion of data, the index comprising, for each of the blocks, an identity of the block and a corresponding location field; identify, from among the blocks, at least one duplicative block that is already stored in the physical data storage but stored at a location other than the location specified by the request, and in response, record, for each of the duplicative blocks, the other location that already stores the block in the corresponding location field of the index, and transmit, to the SAN device, a new request to write data, where the new request identifies the non-duplicative blocks and a location of the one or more logical units of the first set of logical units corresponding to the particular second logical unit specified by the request; and record, for each of the remaining blocks, the location of the block in the corresponding location field the index.

Implementations of the first aspect may include one or more of the following features. The system is configured to generate the new request based on a strategy for increasing an amount of data that can be stored on the SAN device. The strategy is based on the data describing logical units of the SAN device. The strategy is based on a determination that, if the new request does not include duplicative blocks, the quantity of pages of the logical units not allocated to the physical data storage can be increased. The new request further comprises an indication to the SAN device to write the remaining blocks to the logical unit by, at least in part, prioritizing the filling of pages of the logical unit. Prioritizing the filling of pages of the logical unit comprises, when writing data to a page, selecting a page that already contains data instead of selecting a page that does not already contain data. The system is configured to compress the particular portion of data after partitioning the particular portion of data into one or more blocks. The system is configured to compress the particular portion of data after partitioning the particular portion of data into one or more blocks. Data describing a first set of logical units of the SAN device is received from the SAN device.

In a second aspect, in general, a data deduplication device is configured for receiving data describing logical units of a storage area network (SAN) device, the logical units together representing a total quantity of logical data storage that is greater than a total quantity of physical data storage available on the SAN device, where at least some pages of the logical units are not allocated to the physical data storage; receiving requests to write data to the SAN device, where each request identifies a particular location of one of the logical units; and increasing a quantity of the pages that are not allocated to the physical data storage by identifying, among the received requests, at least one request to write data that is already stored in the physical data storage but stored at a location other than the particular location specified by the request, and, in response, not storing the data as requested, but instead recording a pointer from the particular location specified by the request to the other location that already stores the data.

In a third aspect, in general, a method includes presenting, to host devices, a quantity of logical data storage greater than physical data storage available on a storage area network (SAN) device, by deduplicating at least some of the data received from the host devices for storage at the SAN device in a manner that is coordinated with over-provisioning capability of the SAN device.

Implementations of the third aspect may include one or more of the following features. The logical data storage is presented to host devices by a device that does not manage the over-provisioning capability of the SAN device. Deduplicating at least some of the data received from the host devices for storage at the SAN device in a manner that is coordinated with over-provisioning capability of the SAN device comprises providing an indication to the SAN device to write blocks to a logical unit of the SAN device by, at least in part, prioritizing the filling of pages of the logical unit.

In a fourth aspect, in general, a system for managing data-related requests between a host and a storage area network (SAN) device is configured to receive data describing a first set of logical units of the SAN device, the first set of logical units together representing a total quantity of logical data storage that is greater than a total quantity of physical data storage available on the SAN device, where at least some pages of the first set of logical units are not allocated to the physical data storage; present one or more second logical units to the host, wherein the second logical units correspond to one or more logical units of the first set of logical units; receive, from the host, a request to write data to a particular second logical unit, where the request identifies a portion of data and a location of the particular second logical unit; partition the particular portion of data into one or more blocks; create an index for the particular portion of data, the index comprising, for each of the blocks, an identity of the block and a corresponding location field; transmit, to the SAN device, a new request to write data, where the new request identifies at least one of the blocks and a location of the one or more logical units of the first set of logical units corresponding to the particular second logical unit specified by the request, and where the new request comprises an indication to the SAN device to write the at least one block to the logical unit by, at least in part, prioritizing the filling of pages of the logical unit; and record, for at least one of the blocks, the location of the block in the corresponding location field the index.

Implementations of the fourth aspect may include one or more of the following features. The system is configured to generate the new request based on a strategy for increasing an amount of data that can be stored on the SAN device. The strategy is based on the data describing logical units of the SAN device. The strategy is based on a determination that, if the new request does not include duplicative blocks, the quantity of pages of the logical units not allocated to the physical data storage can be increased. Prioritizing the filling of pages of the logical unit comprises, when writing data to a page, selecting a page that already contains data instead of selecting a page that does not already contain data. The system is configured to compress the particular portion of data after partitioning the particular portion of data into one or more blocks. Data describing a first set of logical units of the SAN device is received from the SAN device.

These and other aspects, features, and implementations, and combinations of them, may be expressed as apparatus, methods, means or steps for performing functions, components, systems, program products, and in other ways.

Other aspects, features, and advantages will be apparent from the description and the claims.

DESCRIPTION OF FIGURES

FIG. 8 is a block diagram of an example computer system.

DETAILED DESCRIPTION

Figure 1:
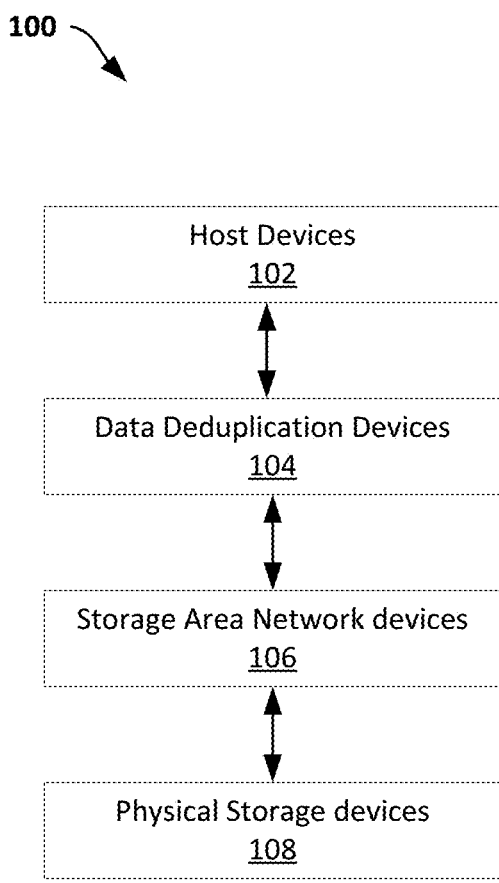
FIG. 1 is a block diagram of a system that stores, retrieves, and modifies data.

A data deduplication system increases the amount of data that can be stored in a data storage system by identifying data that is (or would be) stored in duplicate in more than one location on the data storage system, deleting the data from at least one of the duplicate data locations, and pointing the duplicate data location(s) to the remaining location storing the data. Some data deduplication systems provide data deduplication functionality by managing data-related requests intended for a data storage system.

A data deduplication system that manages data-related requests can be placed between host devices (e.g., user devices) and physical storage devices (e.g., disk drives, flash memory devices, etc.). The data deduplication system can then be used to handle data requests (e.g., requests to read or write data) between the host(s) and the physical storage. The data deduplication system can perform various functions in connection with storage of data on the physical storage devices. For example, the data deduplication system can perform logical unit mapping, data compression, data deduplication, thin provisioning, and over-provisioning.

A logical unit is a representation of data storage that may not directly correspond to physical data storage such as physical disks. Instead, a logical unit may correspond to a portion of a physical data storage device such as a disk, and other logical units may share the same disk. Further, a logical unit may correspond to portions of multiple data storage devices, e.g., in a RAID array. Thin provisioning is the act of not allocating physical resources (e.g., physical blocks of a disk) to logical resources (e.g., a logical unit) until the physical resources are needed. Over-provisioning is the use of thin provisioning to give the appearance of having more physical resources than would be available if all of the logical resources were allocated to physical resources.

As an example, a data deduplication system might receive a host's request to write data to a particular logical unit; in response, the data deduplication system might de-duplicate the data into non-duplicative blocks and write the blocks to an over-provisioned physical storage device that corresponds to the desired logical unit. As another example, a data deduplication system might receive a host's request to read data from a particular logical drive; in response, the data deduplication system might retrieve non-duplicative blocks from a physical storage device that corresponds to the desired logical unit, reconstruct the requested data from blocks, and transfer the data to the host.

A single system need not perform all of these steps. For instance, a data deduplication system might only perform certain functions (e.g., data deduplication). Other functions (e.g., logical drive mapping and over-provisioning) might be performed by another system (e.g., another request management system, such as a storage area network system), or not at all.

For instance, a data storage system might include two systems that manage requests related to data stored on the data storage system. A first system might perform data deduplication but not, for example, over-provisioning. As an example, the first system receives a request to write data to a particular logical drive; in response, the first system de-duplicates the data into non-duplicative blocks. These blocks are then passed to a second system that also manages data-related requests.

The second system might perform logical drive mapping and over-provisioning. As an example, the second system receives blocks of data from the first system, maps the data request to an appropriate physical storage device, and writes the data blocks onto the physical storage device. The second system might over-provision the physical storage devices, for example by presenting a usable storage capacity that is greater than what is actually available on the physical storage devices, under the assumption that not every logical unit will be at full capacity.

The two systems described here could be portions of the same computing device (e.g., software systems executing on the computing device), or, in some examples, could be two separate devices. As a real-world example, the first system may be a deduplication device, and the second system may be a storage area network (SAN) device. The deduplication system can receive requests destined for the SAN device and provide deduplication in a manner that works with over-provisioning capabilities of the SAN device without having to manage the over-provisioning directly.

Performing different functions on separate systems can provide particular benefits. In some cases, separating functionality between multiple systems might allow a user to modularly add functionality to an overall data storage system, or remove functionality from the overall data storage system. As an example, an existing system might have a request management system that only provides logical drive mapping and over-provisioning. A deduplication system can be modularly added to this system, such that data write requests from a host are, for example, first de-duplicated into non-duplicative blocks by the deduplication system and then transmitted to the request management system for further processing. Thus, different functions can be performed at different times and/or by different "layers" of the overall system.

In some cases, multiple request management systems might be capable of performing one of more of the same functions. However, in some cases, it might be beneficial to perform certain functions on only one "layer" of the overall system. As an example, while two request management systems might each be capable of performing over-provisioning, it might be beneficial to provide over-provisioning using only one request management system (e.g., the request management system that most directly interacts with the physical storage devices), such that only a single "layer" of over-provisioning needs to be monitored and managed. In this way, the deduplication system can provide optimization (e.g., storing smaller amounts of data than would be stored if deduplication were not used) for a device that offers its own thin provisioning/over-provisioning in a way that doesn't require thin provisioning/over-provisioning to be managed at the optimization level.

FIG. 1 is a block diagram of a system 100 that stores, retrieves, and modifies data. The system 100 includes one or more host devices 102, one or more data deduplication devices 104, one or more storage area network (SAN) devices 106, and one or more storage devices 108. In an example implementation, a user interacts with a host device 102 in order to create, delete, and modify data. When a user wishes to store particular data (e.g., to retain certain data for later retrieval), data from the host device 102 is transferred to a data deduplication device 104, then transferred to a SAN device 106, and then transferred to a physical storage device 108 where it is stored for future retrieval. When a user wishes to retrieve particular data, data is transferred from a physical storage device 108 to a SAN device 106, then transferred to a data deduplication device 104, then transferred to the host device 102 where it is made available to the user. Any revisions to the data are transferred from the host device 102 to the physical storage device 108 via the data deduplication devices 104 and SAN devices 106, in a manner similar to the storage of data described above.

Various components of system 100 can be interconnected such that they can each transmit data to and receive data from other interconnected components. For example, host devices 102 are interconnected with data deduplication device 104, data deduplication devices 104 are interconnected with host devices 102 and SAN devices 106, SAN devices 106 are interconnected with data deduplication devices 104 and physical storage devices 108, and physical storage devices 108 are interconnected with SAN devices 106. The interconnection of devices can be implemented in a variety of ways. For example, in some implementations, some devices can be interconnected to other devices through a local area network (LAN), through a wide area network (WAN), such as the Internet, or through a Storage Area Network (SAN), such as a Fibre Channel network, an iSCSI network, an ATA over an Ethernet network, or a HyperSCSI network. Other types of networks can also be used, for instance a telephone network (cellular and/or wired), Bluetooth network, near field communications (NFC) network, or other network capable of transmitting data between interconnected systems. In some implementations, two or more networks may be interconnected, such that devices connected to one network can communicate with devices connected to another network. In some implementations, some devices can be directly connected to other devices, for example through a serial bus connection or other direct connection. In some implementations, one or more of the components (e.g., the physical storage devices 108) can be managed by a cloud storage interface. In an example, the physical storage devices 108 can be distributed over one or more networks, and the cloud storage interface can manage data-related requests to and from the physical storage devices 108. In some implementations, the SAN device 106 can be a cloud gateway storage device that functions as a communications node between the physical storage devices 108 and the host devices 102, and provides a cloud storage interface for the physical storage devices 108.

The host devices 102 are devices that process data (e.g., create, delete, or modify data). In some implementations, users can interact with the host devices 102 through an appropriate user interface in order to create, delete, and modify data. As examples, the host devices 102 can be client computing devices, such as desktop computers, laptops, personal data assistants (PDAs), smartphones, tablet computers, or any other computing device that allows a user to view or interact with data. In some implementations, the host devices 102 do not directly interact with users, and instead indirectly receive instructions and data from users through an intermediary system. As examples, the host devices 102 can be computing devices such as server computers that indirectly receive instructions and data from users via client computing devices. In some implementations, the host devices 102 need not receive instructions and data from users at all. For example, in some cases, the host device 102 can be automated, such that they create, delete, and modify data without substantial input from a user.

The physical storage devices 108 are devices that store information in a format that can be readily understood by one or more computer systems. For example, the physical storage devices 108 can be disk accessing storage devices (e.g., hard disk drives), non-volatile random access memory (RAM) devices, volatile RAM devices, flash memory devices, tape drives, memory cards, or any other devices capable of retaining information for future retrieval. In the system 100 shown in FIG. 1, information from the host devices 102 are stored in the physical storage devices 108, and information requested from the host devices 102 are retrieved from the physical storage devices 108.

In order to increase the efficiency and/or reliability of data storage to the physical storage devices 108, data deduplication devices 104 and SAN devices 106 can be used to process data requests and data transfers between the host devices 102 and the physical storage devices 108.

As described above, data deduplication devices 104 increase the amount of data that can be stored in a data storage system by identifying data that is (or would be) stored in duplicate in more than one location on the data storage system, deleting the data from at least one of the duplicate data locations (or not storing the data again if the data is already stored at another location), and creating references from the duplicate data location(s) to the remaining location storing the data. In system 100, data deduplication devices 104 manages data-related requests between the host devices 102 and the physical storage devices 108.

As also described above, a SAN device 106 can also perform tasks similar to those of the data deduplication devices 104, or can perform particular tasks not performed by the data deduplication devices 104. For example, if the data deduplication devices 104 perform data compression and data deduplication, the SAN devices 106 might perform logical unit mapping, thin provisioning, and/or over-provisioning.

Logical unit mapping refers to the mapping of a logical unit to its corresponding physical data storage devices. A logical unit is a representation of data storage that may not directly correspond to physical data storage such as a physical disk. Instead, a logical unit may correspond to a portion of a physical data storage device such as a disk, and other logical units may share the same disk. Further, a logical unit may correspond to portions of multiple data storage devices, e.g., portions of multiple devices arranged in a RAID array. Logical unit mapping can be used to describe the relationship between a logical unit and its corresponding data storage, such that requests (e.g., data storage requests or data retrieval by host devices 102) referencing particular logical units can be converted into requests referencing one or more corresponding portions of the physical storage devices (e.g., the physical storage devices 108).

Thin provisioning is the act of not allocating physical resources (e.g., physical portions of a disk) to logical resources (e.g., a logical unit) until the physical resources are needed. For example, a physical storage device having 100 GB of storage capacity might be provisioned into ten logical units, each presenting a storage capacity of 10 GB. This physical storage can be "thin provisioned," such that even though each of the logical units are presented with 10 GB of storage capacity, storage portions of the physical storage device are not allocated to each of the logical units until these portions of the physical storage device are actually needed. These portions of the physical storage device can be, for example, allocated to "pages" of a logical unit, where each page represents the minimum amount of storage than can be allocated for the purposes of thin provisioning. Therefore, when no data is stored on any of the logical units, portions of the physical storage device are not substantially allocated to any pages of the logical units. As data is written to each of the logical units, portions of the physical storage are incrementally allocated to the pages of the logical units to fulfill each data storage request. In some implementations, a page corresponds to an aggregation of sequential blocks.

Over-provisioning is the use of thin provisioning to give the appearance of having more physical resources than would be available if all of the logical resources were allocated to physical resources. For example, a physical storage device having 100 GB of storage capacity might be over-provisioned into twenty logical units, each presenting a storage capacity of 10 GB. Thus, the logical units cumulatively present 200 GB of available storage capacity, even though the underlying physical storage device only has a storage capacity of 100 GB. However, as the physical storage device is thin provisioned, when no data is stored on any of the logical units, none of the portions of the physical storage device are allocated to any pages of the logical units, regardless of the storage capacity presented by each of the logical units. As data is written to each of the logical units, portions of the physical storage device are incrementally allocated to the pages of the logical units to fulfill each data storage request. In this manner, an over-provisioned physical storage device can fulfill data storage requests corresponding to each of the logical units, so long as the cumulative data across all of the logical units does not exceed the physical storage limits of the physical storage device.

Multiple physical storage devices can be collectively thin provisioned or over-provisioned. As an example, a collection of ten physical storage devices, each having 100 GB of storage capacity might be over-provisioned into 100 logical units, each presenting a storage capacity of 100 GB. Thus, the logical units cumulatively present 10 TB of available storage capacity, even though the underlying physical storage devices only have a cumulative storage capacity of 1 TB. In the event that the cumulative data across all of the logical units approaches the physical storage limits of the physical storage devices, additional physical storage devices can be added to increase the cumulative storage capacity of the collection of physical storage devices.

The data deduplication devices 104 and the SAN devices 106 can work in conjunction in order to collectively provide data compression, data deduplication, logical unit mapping, thin provisioning, and/or over-provisioning between the host devices 102 and the physical storage devices 108. For example, referring to FIG. 2, the system 200 includes several host devices 102a-d, a data deduplication device 104a, a SAN device 106a, and several storage devices 108a-d.

The SAN device 106 provides logical unit mapping, thin provisioning, and over-provisioning for the physical storage devices 108a-d. In system 200, the SAN device 106a provides logical unit mapping, thin provisioning, and over-provisioning of the physical storage devices 108a-d into the logical units 206a-d, such that any requests pertaining to one of the logical units 206a-d are mapped to one or more corresponding physical storage units 108a-d, and vice versa.

In some cases, the SAN 106a can logically map and over-provision a single physical storage device into a single logical unit. For example, the physical storage device 108a can include a hard disk drive 208a having a physical storage capacity of 100 GB. The SAN 106a maps a single logical unit 206a to the physical storage device 108a, and over-provisions the physical storage device 108a, such that the 100 GB storage capacity of the hard disk drive 208a is provisioned into a 1000 GB storage capacity in the logical unit 206a.

In some cases, the SAN 106a can logically map and over-provision multiple physical storage devices into a single logical unit. For example, the physical storage devices 108b-c can each include a hard disk drive 208b-c each having a physical storage capacity of 100 GB. The SAN 106a maps a single logical unit 206b to the physical storages device 108b-c, and over-provisions the physical storage devices 108b-c, such that the 200 GB cumulative storage capacity of the hard disk drives 208b-c is provisioned into a 2000 GB storage capacity in the logical unit 206b.

In some cases, the SAN 106a can logically map and over-provision a single physical storage device into a multiple logical units. For example, the physical storage device 108d can include a hard disk drive 208d having a physical storage capacity of 100 GB. The SAN 106a maps multiple logical units 206c-d to the physical storage device 108d, and over-provisions the physical storage device 108d, such that the 100 GB storage capacity of the hard disk drive 208d is provisioned into a logical unit 206c having a 100 GB storage capacity and a logical unit 206d having a 1000 GB storage capacity.

While examples of logical mapping and over-provisioning are described above, these examples are intended only to conceptually illustrate these features. In practice, the SAN 106a can logically map and over-provision any number of physical storage devices into any number of logical units.

In the system 200, the data deduplication device 104a is situated between the hosts 102a-d and the SAN device 106a, such that it receives data requests (e.g., requests to read, write, or erase data) from the hosts 102a-d, interprets the requests, creates a new request, and transmits the new request to the SAN device 106a. This new request can be used to implement various features, independent from the capabilities of the hosts 102a-d and the SAN device 106a.

As an example, in the system 200 the SAN device 106a performs logical mapping and over-provisioning, but does not perform data compression or data deduplication. During operation of the system 200, requests from the hosts 102a-d to write data to a logical unit of the SAN device 106a are intercepted by the data deduplication device 104a, which generates new data requests to provide data compression and/or data deduplication. The data deduplication device 104a then transmits the new request to the SAN device 106a, which writes the compressed and/or deduplicated data to one or more corresponding physical storage devices 108a-d. Thus, though the hosts 102a-d and the SAN device 106a are not individually capable of performing data compression or data deduplication, the data deduplication device 104a transparently generates new requests to write data in a manner that implements these features.

As another example, during operation of the system 200, requests from the hosts 102a-d to retrieve data from the logical unit of the SAN device 106a are intercepted by the data deduplication device 104a, which generates new data requests to account for any data compression and/or data deduplication that may have been previously provided by data deduplication device 104a during the storage of the requested data. The data deduplication device 104a then transmits the new request to the SAN device 106a. The retrieved data is passed from the SAN device 106a, and is modified (e.g., decompressed or re-constructed from deduplicated data) by the data deduplication device 104a to account for any data compression and/or data deduplication that may have been previously provided. The requested data is then returned to the host 102a-d where it is made available for access. In this manner, though the hosts 102a-d and the SAN device 106a are not individually capable of interpreting data that has been compressed or deduplicated, the data deduplication device 104a transparently generates new requests to read data in a manner that implements these features.

In the system 200, the data deduplication device does not provide thin provisioning or over-provisioning. For example, while the logical units 206a-d of the SAN device 106a have been logically mapped to the logical units 204a-d of the data deduplication device 104a in a manner that redistributes the storage capacities of the logical units 206a-d, the total storage capacity of the logical units 206a-d of the SAN device 106a is the same as the total storage capacity of the logical units 204a-d of the data deduplication device 104a. In turn, the storage capacity of each logical unit 204a-d of the data deduplication device 104a is the same as the storage capacity of a corresponding logical unit 202a-d of a host 102a-d. In this manner, thin provisioning and/or over-provisioning only occurs on a single "layer" of the system 200 (i.e., between the SAN device 106a and the physical storage devices 108a-d). On other layers of the system, logical units are mapped into one or more other logical units, but are not thin provisioned or over-provisioned. Accordingly, in this example, the total presented capacity does not change during these logical mappings.

As described above, a data deduplication device 104 can be situated between the hosts 102 and the SAN device 106, such that it receives data requests from the hosts 102, interprets the requests, creates a new request, and transmits the new request to the SAN device 106. This new request can be used to implement various features independent from the capabilities of the hosts 102 and the SAN device 106. For example, in some implementations, the SAN device 106 might receive data and data-related requests from the hosts 102, and provide logical mapping and over-provisioning to the physical storage devices 108. A data deduplication device 104 can used to manage data and data-related requests between the hosts 102 and the SAN device 106 in order to provide data compression and data deduplication, even though the hosts 102 and the SAN device 106 might not be individually capable of providing these functions.

In some cases, the data deduplication device 104 receives, from the SAN device 106, data describing logical units of the SAN device. This information can include, for example, information that describes the storage capacity of the logical unit, the identity of data stored on the logical unit (e.g., blocks, or portions, of data that are stored on the logical unit), the location of the data stored on the logical unit (e.g., the particular pages of the logical unit that store particular blocks of data), the location of free space on the logical unit (e.g., the location of pages of the logical unit that do not contain any data), and so forth. If the SAN device 106 provides over-provisioning, the logical units seen by the data deduplication device 104 might together represent a total quantity of logical data storage that is greater than a total quantity of physical data storage available on the SAN device, where at least some pages of the logical units are not allocated to the physical data storage devices 108.

Figure 3A:
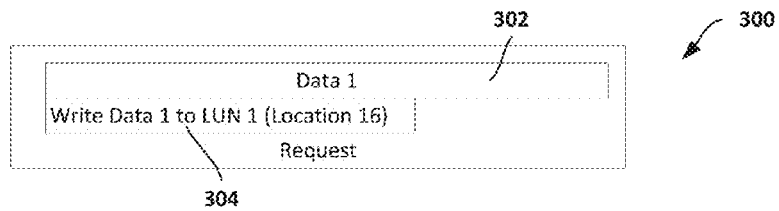
FIG. 3A is a block diagram of a request to write data.

In some implementations, the data deduplication device 104 might receive a request from the host 102 to write data to a particular logical unit of the SAN device 106. FIG. 3A shows a conceptual example of a request 300 to write data. The request 300 might include, for example, a particular portion of data 302 to be written, and an instruction 304 to write the data 302 to a particular location of a logical unit. For instance, the instruction might specify a particular LUN presented by a data deduplication device 104 and a logical block address (LBA) that specifies the location within the LUN.

Figure 3B:
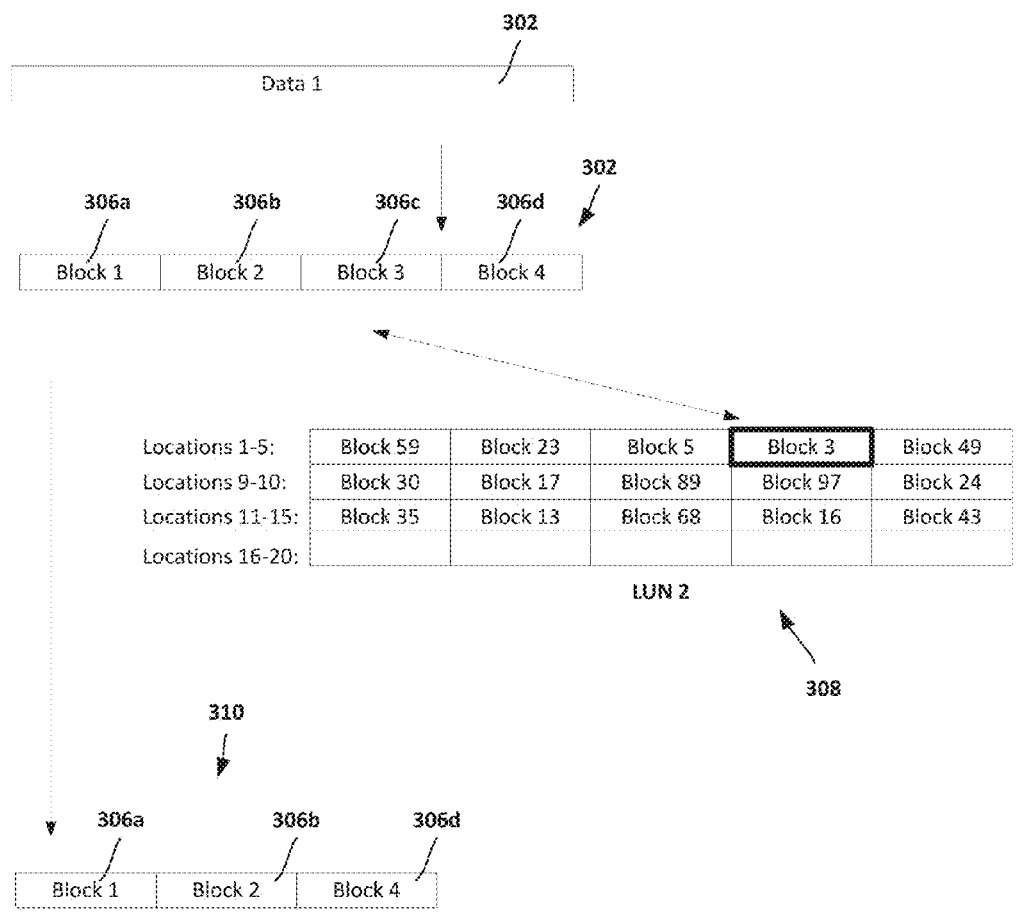
FIG. 3B is a block diagram of a data deduplication operation.

In response, the data deduplication device 104 might perform data deduplication on the data 302. A conceptual example of these operations is shown in FIG. 3B. In this example, the data deduplication device 104 partitions the data 302 into one or more blocks. For instance, in this example, the data 302 is partitioned into several blocks 306a-d. In some implementations, each block of data can be substantially the same size (e.g., have a uniform block size). In some implementations, some blocks of data can have a different size than other blocks of data (e.g., have a variable block size). Data can be partitioned according to certain observed properties of the data, and/or according to particular pre-defined parameters. For example, in some implementations, data can be partitioned such that each block is of a certain pre-defined size. As another example, in some implementations, data can be parsed and partitioned based on certain properties of the parsed data. For instance, data might be parsed and partitioned when certain characteristics (e.g., particular sequences of bits) are observed. In some implementations, data might be parsed and hashed (e.g., using a hashing algorithm), and partitioned when certain characteristics in the hash value are observed (e.g., when particular hash values are observed). In the example shown in FIG. 3B, the data 302 is partitioned such that each block 306a-d is of a particular pre-defined size.

After the data is partitioned into blocks, the data deduplication device 104 identifies, from among the blocks, duplicative blocks that are already stored in the physical data storage devices but stored at a location other than the location specified by the request. If any duplicate blocks are found, the data deduplication device 104 records, for each of the duplicative blocks, the other location that already stores the block, and deletes the duplicative blocks. For example, as shown in FIG. 3B, each of the blocks 306*a-d* is compared against the blocks of a logical unit 308. In some implementations, this comparison can be an exact byte-by-byte comparison between the blocks 306*a-d* and the blocks of the logical unit 308. However, in some implementations, this comparison need not be an exact byte-by-byte comparison, and can be instead be accelerated by a deduplication index. As an example, a deduplication index might include hash values of each block of the logical unit 308, such that the hashes of blocks 306*a-d* can be compared against the hashes of the blocks of the logical unit 308 in order to find duplicative data.

The logical unit 308 can be, for example, one or more of the logical units 206*a-d* of the SAN device 106*a*. The logical unit 308 need not be the logical unit specified by the request 300. For example, while the original request 300 specifies data to be written to a particular logical unit of the data deduplication device 104*a* (i.e., "LUN 1"), because of the logical mapping performed by the data deduplication device 104, each of the blocks 306*a-d* is compared against the blocks stored in the pages of a corresponding logical unit 308 of a SAN device 106 to which "LUN 1" is mapped (i.e., "LUN 2"). As shown in FIG. 3B, locations 1-15 of the logical unit 308 (indicated by location labels, sometimes called logical block addresses [LBAs]) are storing various blocks of unique data (indicated by different numerical block labels), while locations 16-20 are empty (indicated by the absence of labels). Here, the block 306*c* matches a block already stored in the logical unit 306 (i.e., the block stored in location 4 of the logical unit 308). Based on this match, the data deduplication device 104 records for the duplicative block 306*c*, the other location that already stores the block (i.e, location 4 of the logical unit 308), and deletes the block 306*c*. The resulting deduplicated data 310 retains each of the unique blocks 306*a*, 306*b*, and 306*d*, but no longer has the duplicative block 306*c*.

Figure 3C:
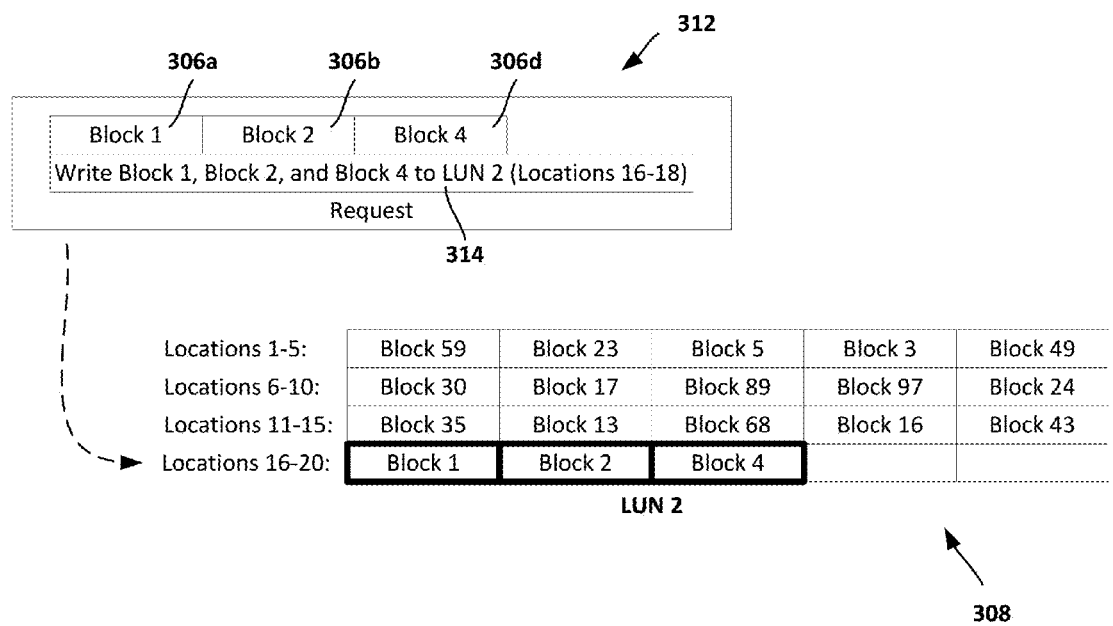
FIG. 3C is a block diagram of a new request to write data.

After the data is deduplicated, a new write request is created based on the deduplicated data and the original request 300. For example, as shown in FIG. 3C, after the data 302 is partitioned and deduplicated into unique blocks 310, the data deduplication device 104 creates a new write request 312. The new write request 312 might include, for example, the remaining blocks 306*a*, 306*b*, and 306*d* to be written, and an instruction 314 to write the blocks 306*a*, 306*b*, and 306*d* to the logical unit 308 corresponding to the logical unit specified by the original request 300. As an example, if the original request 300 specifies data to be written to a particular logical unit of the data deduplication device 104*a* (i.e., "LUN 1"), the new write request 312 might specify that the remaining blocks be written to the corresponding logical unit 308 of the SAN device 106*a*. This request is then transmitted to the SAN device 106 for processing, whereby the blocks 306*a*, 306*b*, and 306*d* are written to the indicated logical unit 308 (i.e., locations 16-17 of the logical unit 308). The location of each of these blocks is recorded by the data deduplication device 104. As the block 306*c* was duplicative of a block already stored in the logical unit 308, it has not been written to the logical unit 308. Thus, each block stored on the logical unit 306 can be unique.

After the new requested is sent to the SAN device 106, the blocks 306*a*, 306*b*, and 306*d* are deleted from the data deduplication device 104.

As described above, the location of each block within the specified logical unit is recorded by the data deduplication device 104. These locations can be stored, for example, in an index or other data structure for future retrieval. The index can be stored in various locations, depending on the implementation. For example, the index can be stored within the SAN device 106, within the data duplication device 104, or elsewhere.

Figure 3D:
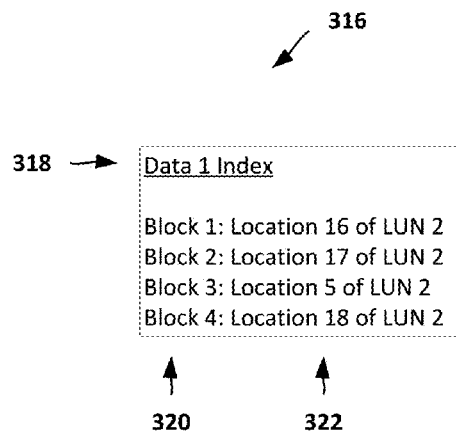
FIG. 3D is a block diagram of an index.

A conceptual example of an index 316 is shown in FIG. 3D. As shown in FIG. 3D, an index 316 might include identity information 318 pertaining to the subject data (e.g., the data 302). The index 316 might also include identity fields 320 and location fields 322 pertaining to each of the blocks of the subject data (e.g., the blocks 306*a-d*). The index 316 might also include information regarding the proper sequence of the blocks (e.g., by listing the identity fields 320 and the location fields 322 in a particular order). In this manner, after the creation of the new write request, and after the data has been written by the SAN device, the data deduplication device 104 retains information regarding the identity of particular data, and the identity, location, and sequence of the blocks that make up that particular data.

The data deduplication device 104 can also retrieve data from one or more of the logical units of the SAN device 106. In some implementations, the data deduplication device 104 can be situated between the hosts 102 and the SAN device 106, such that it receives requests from the hosts 102 to retrieve data from the SAN device 106. In response, the data deduplication device 104 interprets the request, creates a new request, and transmits the new request to the SAN device 106. If the data deduplication device 104 created an index when the data was initially written to the logical unit, the data deduplication device 104 can use that index to create the new request.

Figure 4:
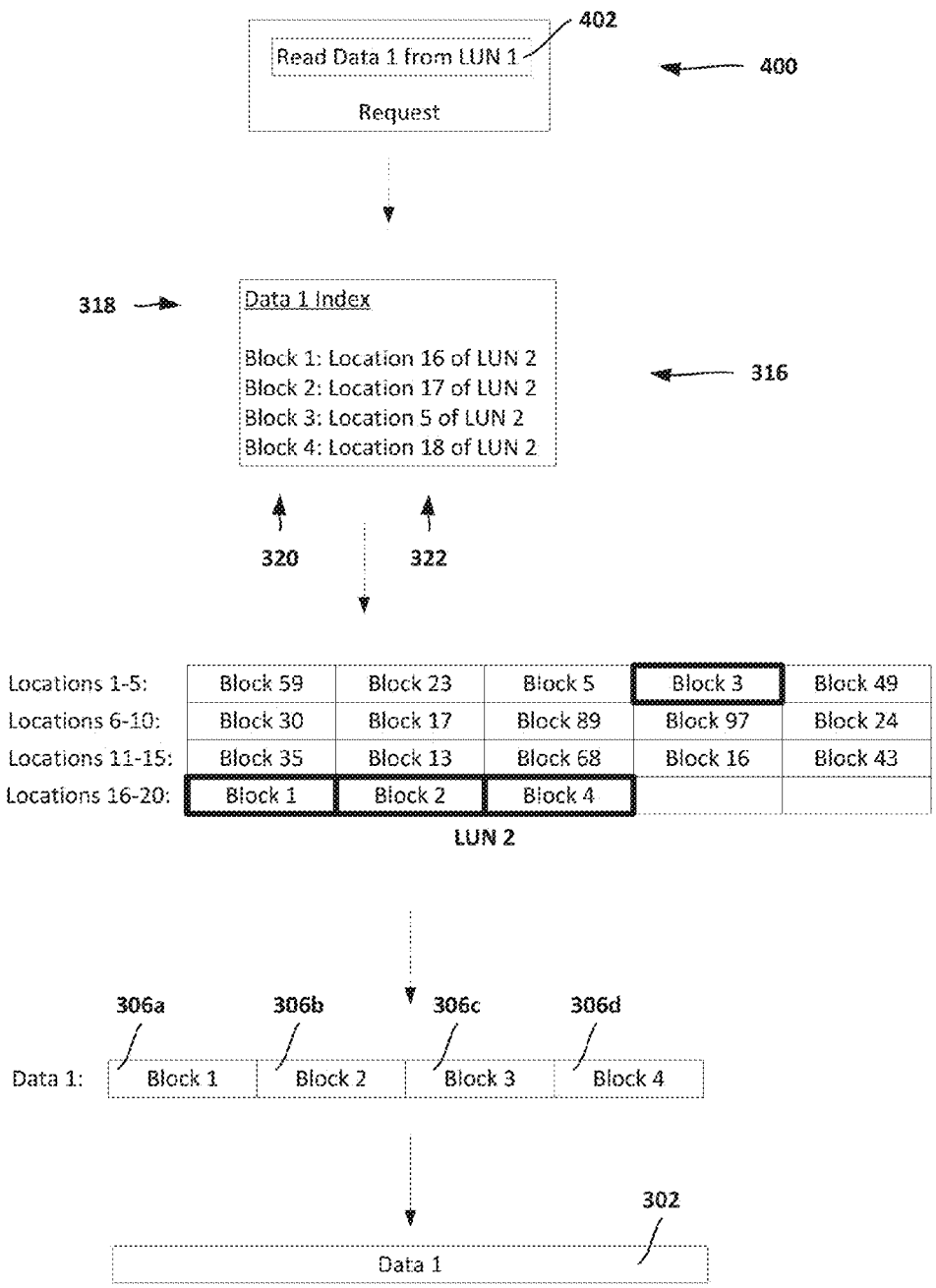
FIG. 4 is a block diagram of a request to retrieve data.

As an example, in some implementations, the data deduplication device 104 might receive a request from the host 102 to retrieve data from a particular logical unit of the SAN device 106. FIG. 4 shows a conceptual example of a request 400 to retrieve data. The request 400 might include, for example, an instruction 402 to retrieve particular data from a particular logical unit of the SAN device 106. In this example, the requested data is the same data 302 that was written to the SAN device 106 in FIGS. 3A-D.

In response to the request, the data deduplication device 104 uses the index 316 (which was created when the data was written to the logical unit) to retrieve the appropriate blocks from the corresponding logical unit. As described above, the index 316 might include identity information 318 pertaining to the subject data (e.g., the data 302), as well as identity fields 320 and location fields 322 pertaining to each of the blocks of the subject data (e.g., the blocks 306*a-d*). The index 316 might also include information regarding the proper sequence of the blocks (e.g., by listing the identity fields 320 and the location fields 322 in a particular order). Using information from the index 316, the data deduplication device 104 creates a new request to the SAN device 106, requesting the retrieval of the blocks 306*a-d* identified in the index 316.

Once the appropriate blocks 306*a-d* are retrieved, the data deduplication device 104 arranges the blocks 306*a-d* into the appropriate order (e.g., in the sequence described in the index 316). Therefore, when recombined, the blocks 306*a-d* form the data 302. The data 302 is then transmitted to the host, thereby fulfilling the retrieval request 402.

In this manner, the data deduplication device 104 allows a host device 102 to retrieve data that has been deduplicated, even though the host device 102 and the SAN device 106 might not be individually capable of interpreting compressed or deduplicated data.

In some implementations, the data deduplication device 104 can also perform data compression. Data compression can be performed in conjunction with data deduplication. For example, in some implementations, after the data 302 is partitioned into the blocks 306*a-d*, each of the blocks 306*a-d* can be compressed using one or more compression algorithms. A compression algorithm can, for example, encode data such that the data can be represented by fewer bits than the original representation. Example compression algorithms include Lempel-Ziv-based algorithms (e.g., Lempel-Ziv, Lempel-Ziv-Welch, Lempel-Ziv-Markov chain, and Lempel-Ziv-Oberhumer), and Burrows-Wheeler transform-based algorithms (e.g., bzip2). Other types of compression techniques can be used, depending on the implementations. Once the blocks 306*a-d* have been compressed, the compressed blocks can then be deduplicated, for example in the manner described above. In some implementations, a compressed block contains a compressed version of data of multiple uncompressed blocks.

In some implementations, instead of performing data compression immediately after partitioning data 302 into blocks 306*a-d*, the data duplication device 104 can instead perform data compression after the performance of data deduplication. For example, referring to FIG. 3B, after data deduplication is performed, the resulting deduplicated data 310 retains each of the unique blocks 306*a*, 306*b*, and 306*d*, but no longer has the duplicative block 306*c*. Each of these unique blocks 306*a*, 306*b*, and 306*d* can then be compressed. In this manner, data compression is only performed on unique blocks, and data compression is not unnecessarily performed on duplicative blocks that are later eliminated.

In some implementations, blocks that are compressed might result in compressed blocks of different sizes. In this case, multiple compressed blocks can be combined as a single combined block for storage on the logical unit 308. In this manner, regardless of the size of each compressed block, multiple such blocks can be packed into a one or more blocks of uniform size for storage. The contents of each combined block can be recorded, for example, in a compression index that describes each of the compressed blocks contained within each of the combined blocks.

In implementations where data deduplication device 104 performs both data deduplication and compression, the blocks written and stored on the logical unit 308 are blocks of compressed data. Thus, if data duplication is performed prior to data compression, each of the uncompressed blocks (e.g., blocks 306*a-d*) cannot be directly compared to the blocks stored on the logical unit 308. In these implementations, the data deduplication device 104 can determine the contents of each of the compressed blocks of the logical unit 308 during deduplication. This can be performed, for example, by associating hash values or other data that indicate the uncompressed contents of a particular compressed block. In this manner, data deduplication can be performed, even when comparing uncompressed blocks against compressed blocks.

In some implementations, if data compression was performed during the data writing process, during the data reading process each of the compressed blocks can be decompressed after they are retrieved. These decompressed blocks can then be recombined to form the uncompressed data 302. The uncompressed data 302 can then transmitted to the host, thereby fulfilling the retrieval request 402. The data deduplication device 104 need not perform both data compression and data deduplication. For example, in some implementations, the data deduplication device 104 might only perform data deduplication, and not data compression. Data compression can be performed by another device (e.g., another data deduplication device 104), or not at all. As another example, the data deduplication device 104 might only perform data compression, and not data deduplication. In a similar manner, data deduplication can be performed by another device (e.g., another data deduplication device 104), or not at all. In yet another example, the data deduplication device 104 might not perform data compression or data deduplication at all, and instead only performs logical mapping on the logical units of the SAN device. In a similar manner, data deduplication and data deduplication can be performed by another device (e.g., one or more other data deduplication devices 104), or not at all.

Figure 5A:
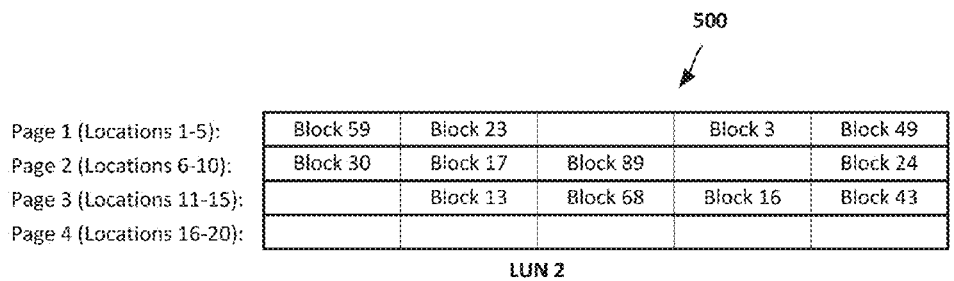
FIG. 5A is a block diagram of a logical unit of a SAN device.

In some implementations, the data deduplication device 104 might partition data into blocks, where each block has a size that corresponds with the size of the pages of a logical unit. For example, in some cases, the data deduplication device 104 might partition data into blocks having the same size as the pages of a logical unit. However, in some cases, the data deduplication device 104 might partition data into blocks that have a different size as the pages of a logical unit. For instance, in some implementations, the blocks can be smaller than the pages of a logical unit, such that multiple blocks can be stored on a single page of the logical unit. An example logical unit 500 of a SAN device 106 is shown in FIG. 5A. In this example, each page of the logical unit 500 can store up to five blocks.

Figure 5B:
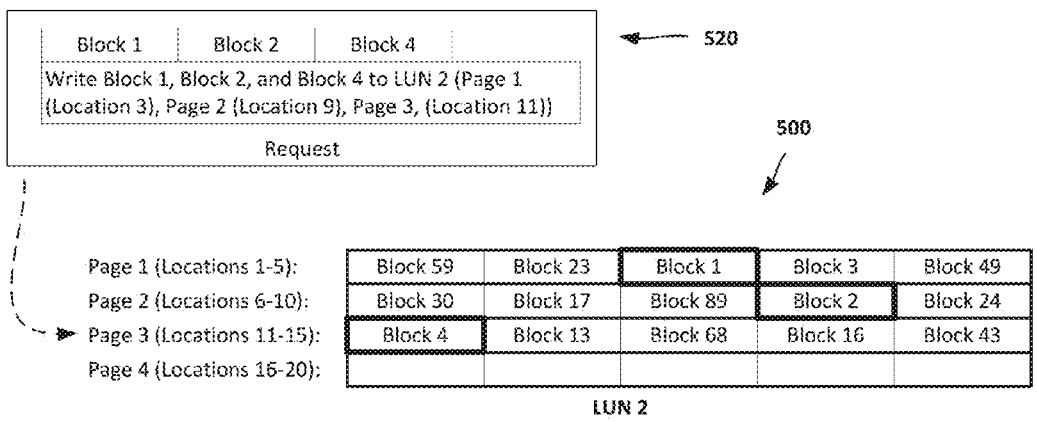
FIG. 5B is a block diagram of a request to write data to a logical unit of a SAN device in a manner that prioritizes the filing of pages of the logical unit.
Figure 6:
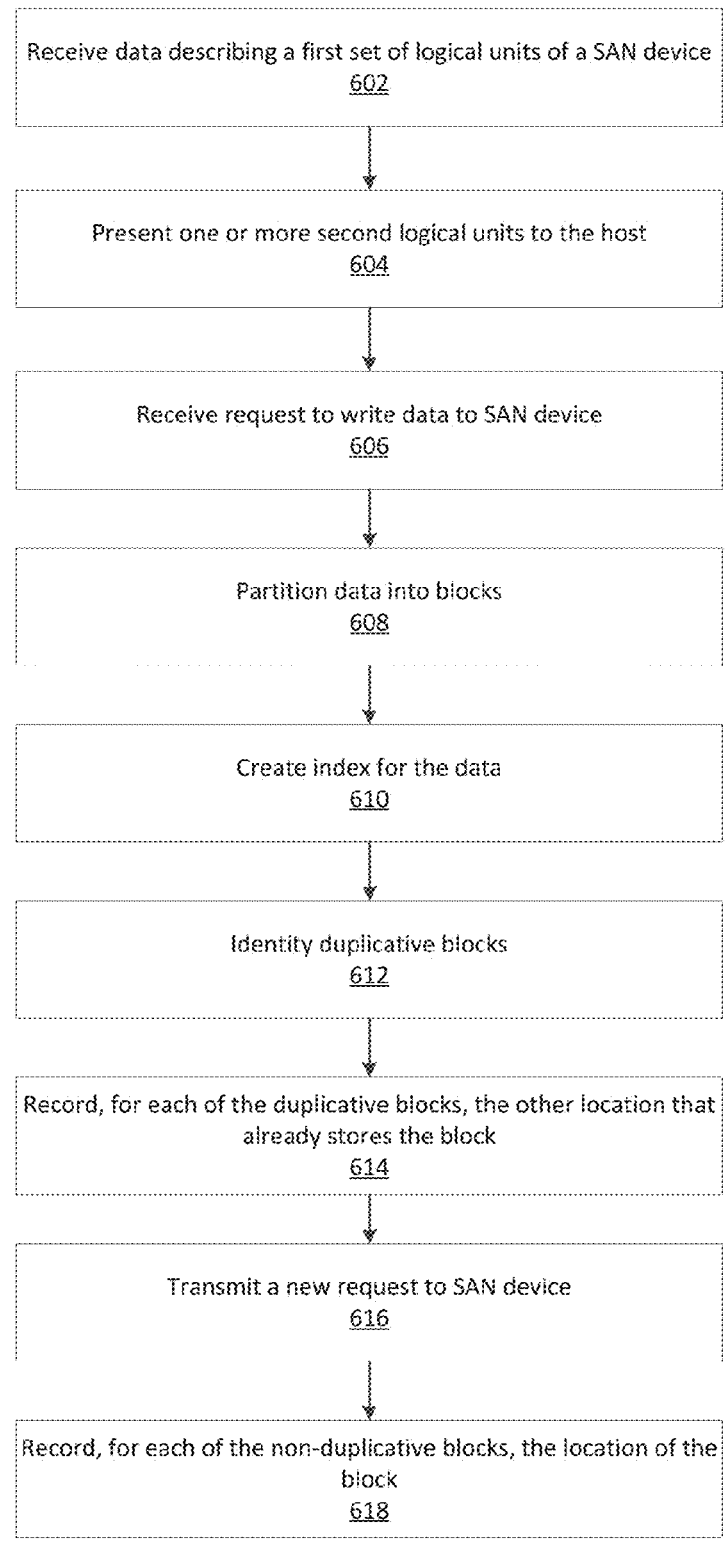
FIG. 6 is a block diagram of a process for managing data-related requests between a host and a SAN device.

In some implementations, when the size of each block is different than the size of the pages of a logical unit (e.g., as shown in FIG. 5A), in response to a receiving a request to write data from a host, the data deduplication device 104 might create a new request to write data to a logical unit of a SAN device 106 in a manner that prioritizes the filling of pages of the logical unit (e.g., as shown in FIG. 5B). For example, the logical unit 500 shown in FIG. 5A has four pages, where each page can store up to five blocks. Here, pages 1, 2 and 3 each stores four blocks, and page 4 stores no blocks. If the data deduplication device 104 receives a request to write data to the logical unit 500, the data deduplication device 104 can create a new request 520 to the SAN device 106, instructing that each of the pages be filled before writing any blocks to empty pages. For example, the new request 520 might instruct a first block (e.g., block 1) to be written to an available portion of page 1, instruct a second block (e.g., block 2) to be written to an available portion of page 2, and instruct a third block (e.g., block 4) to be written to an available portion of page 3. In this manner, pages 1, 2, and 3 are filled, while page 4 remains empty. This prioritization can be beneficial in certain circumstances. For example, in some cases, it is desirable to fully utilize pages of a logical unit that have already been allotted for use (e.g., already contain some data), such that additional pages are not allocated unnecessarily. This can increase the number of pages that are available for use, and can improve the overall storage efficiency of the data storage system.

An example process 600 for managing data-related requests between a host and SAN device is shown in FIG.

6. The process 600 can be performed, for example, by one or more data deduplication devices 104.

The process 600 begins with receiving, from the SAN device, data describing a first set of logical units of the SAN device (step 602). In implementations where the SAN device performs over-provisioning and thin provisioning, the first set of logical units together can represent a total quantity of logical data storage that is greater than a total quantity of physical data storage available on the SAN device, where at least some pages of the first set of logical units are not allocated to the physical data storage. As described above, this information can include, for example, information that describes the storage capacity of the logical unit, the identity of data stored on the logical unit (e.g., blocks, or portions, of data that are stored on the logical unit), the location of the data stored on the logical unit (e.g., the particular pages of the logical unit that store particular blocks of data), the location of free space on the logical unit (e.g., the location of pages of the logical unit that do not contain any data), and so forth. This information can be received continuously, periodically, or intermittently.

Figure 2:
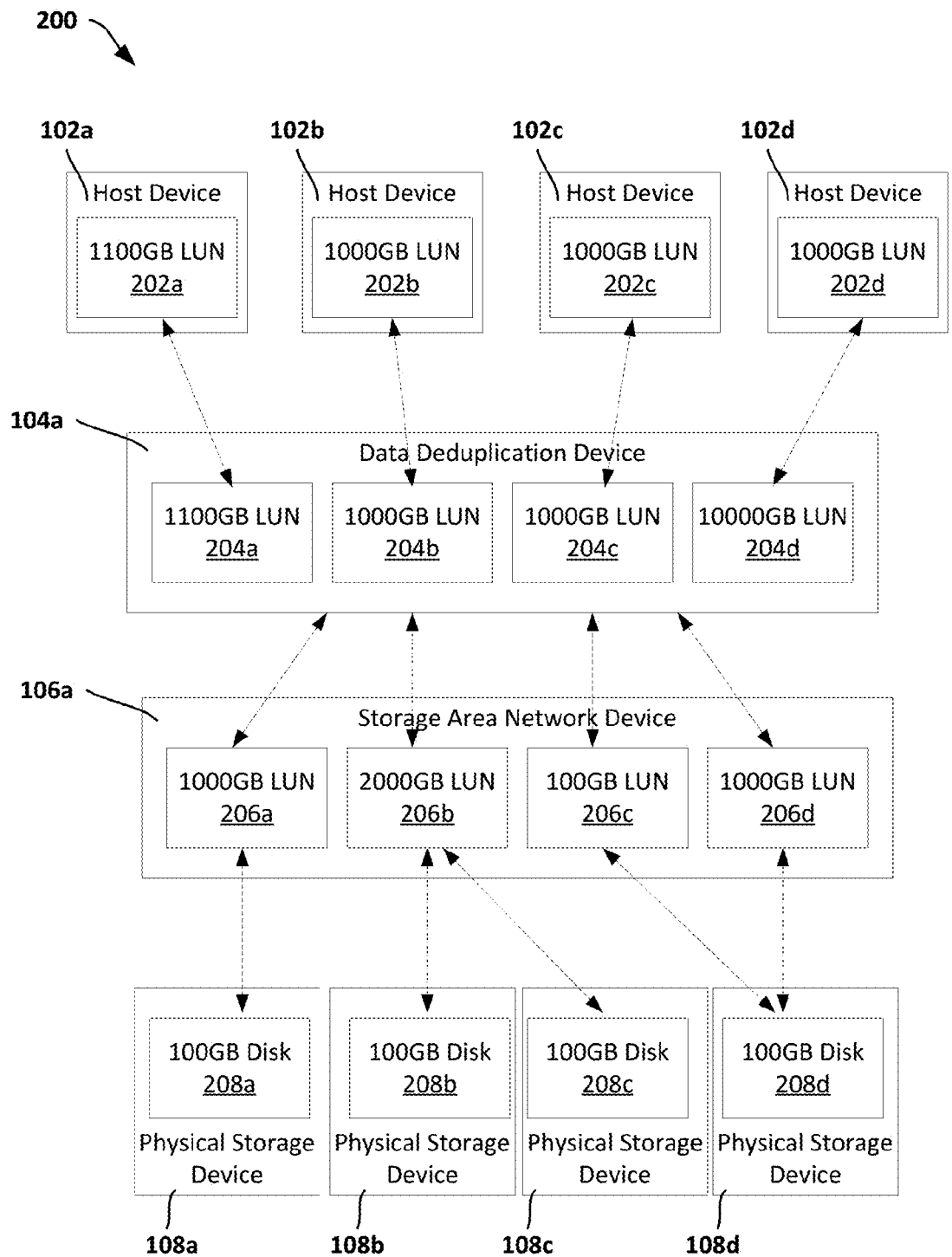
FIG. 2 is a block diagram of a system that includes several host devices, a data deduplication device, a storage area network (SAN) device, and several storage devices.

The process 600 includes presenting one or more second logical units to the host (step 604). The second logical units can correspond to one or more logical units of the first set of logical units. As an example, this can be performed as shown in FIG. 2, in which a set of logical units (e.g., the logical units 204*a-d*) are presented to the hosts 102*a-d*, where the logical units 204*a-d* correspond to the logical units 206*a-d* of the SAN device 106*a*. As described above, the first set of logical units can be logically mapped to the second logical units in a manner that redistributes the storage capacities of the first logical units.

The process 600 includes receiving, from the host, a request to write data to a particular second logical unit, where the request identifies a portion of data and a location of the particular second logical unit (step 606). This request can be similar to the example requests described above, for example the request 300 of FIG. 3A.

The received portion of the data is then partitioned into one or more blocks (step 608). Data can be partitioned, for example, using one or more of the techniques described above, for example the data partitioning technique shown in FIG. 3B.

An index is created for the portion of the data (step 610). This index can be similar to the indices described above, for example the index 316 shown in FIG. 3D. An index can contain, for each of the blocks, an identity of the block and a corresponding location field for storing the location of that block.

The blocks are examined in order to identify, from among the blocks, duplicative blocks that are already stored in on a physical data storage device (e.g., a physical storage device 108 connected to the SAN device 106), but stored at a location other than the location specified by the request (step 612). Identifying duplicative blocks can be performed, for instance, in a manner similar to the example processes described above, for example the process shown in FIG. 3B.

In response to identifying one or more duplicative blocks, the system records, for each of the duplicative blocks, the other location that already stores the block in the corresponding location field of the index (step 614). Examples of recording location information for each block are described above, for example the description in reference to the index 316 of FIG. 3D.

The system then transmits, to the SAN device, a new request to write data, where the new request identifies the non-duplicative blocks and a location of the one or more logical units of the first set of logical units corresponding to the particular second local unit specified by the request (step 616). This new request can be similar to the example new requests described above, for example the new request 310 of FIG. 3C.

For each of the remaining blocks, the system records the location of the block in the corresponding location field of the index (step 618). Examples of recording location information for each block are described above, for example the description in reference to the index 316 of FIG. 3D.

The process 600 can be performed, for example, by one or more data deduplication devices 104 that are situated between one or more hosts 102 and one or more SAN devices 106, such that it receives data requests from the hosts 102, interprets the requests, creates a new request, and transmits the new request to the SAN device 106. Implementations of the process 600 can be used to provide various features independent from the capabilities of the hosts 102 and the SAN device 106.

In some implementations, the new request can be generated based on a strategy for increasing an amount of data that can be stored on the SAN device, where the strategy is based on the data describing logical units of the SAN device. For example, as described above, a data deduplication device 104 can reference data describing the logical units of a SAN device 106, such as information that describes the storage capacity of the logical unit, the identity of data stored on the logical unit, the location of the data stored on the logical unit, the location of free space on the logical unit, and so forth. The data deduplication device 104 can use this information in order to create a new request that increases the amount of data that can be stored on the logical units of the SAN device 106. In some implementations, this strategy can be based on a determination that, if the new request does not include duplicative blocks, the quantity of pages of the logical units not allocated to the physical data storage can be increased. For example, the data deduplication device 104 can create a new request that includes an indication to the SAN device 106 to write the non-duplicative blocks to the logical unit by, at least in part, prioritizing the filling of pages of the logical unit, for example as described in reference to FIGS. 5A-B. In these cases, the number of pages that are not allocated might be greater than had the blocks been stored in a manner that did not prioritize the filling of pages, and thus could increase the amount of data that can be stored in the logical units of the SAN device.

In some implementations, prioritizing the filling of pages of the logical unit can include, when writing data to a page, selecting a page that already contains data instead of selecting a page that does not already contain data. An example of this is shown, for instance, in FIGS. 5A-B, where blocks written to pages that already contain data (i.e., pages 1, 2, and 3), rather than a page that does not already contain data (i.e., page 4). In some implementations, this prioritization technique can also increase the amount of data that can be stored in the logical units of the SAN device.

In some implementations, the new request can also include an indication to the SAN device to write the non-duplicative blocks to one or more particular pages of the logical unit, wherein the system is configured to select the particular pages based, at least in part, on identifying obsolete pages of the logical unit. Obsolete pages can be pages containing data that are no longer needed, for example pages that contain data that has been copied to a different location, or data that has been identified for deletion (e.g., by a user or a system). The new request can include an indication to overwrite these obsolete pages, such that additional pages do not have to be allocated unnecessarily. In some implementations, this technique can also increase the amount of data that can be stored in the logical units of the SAN device.

In some implementations, a data deduplication device 104 can be configured to receive, from a SAN device 106, data describing logical units of the storage area network device. If the SAN device performs over-provisioning and thin provisioning on one or more physical storage devices 108, the logical units of the SAN device 106 might together represent a total quantity of logical data storage that is greater than a total quantity of physical data storage available on the SAN device, where at least some pages of the logical units are not allocated to the physical data storage.

The data deduplication device 104 can also be configured to receive requests to write data to the SAN device 106, where each request identifies a particular location of one of the logical units. For example, a request can be similar to the request 300 of FIG. 3A.

The data deduplication device can also be configured to increase a quantity of the pages that are not allocated to the physical data storage by identifying, among the received requests, at least one request to write data that is already stored in the physical data storage but stored at a location other than the particular location specified by the request. In response, the data deduplication device does not store the data as requested, but instead records a pointer from the particular location specified by the request to the other location that already stores the data. This can be performed, for example, using the data deduplication techniques shown in FIGS. 3A-D. As an example, instead of storing a duplicative block (e.g., the block 306c), the data deduplication device could store a pointer within the index 316, identifying the location that already stores the duplicative block.

In some implementations, a data deduplication device 104 can present, to host devices (e.g., the host devices 102), a quantity of logical data storage greater than physical data storage available on a SAN device (e.g., a SAN device 106), by deduplicating at least some of the data received from the host devices for storage at the SAN device in a manner that is coordinated with over-provisioning capability of the SAN device. This can be performed, for example, using the data deduplication techniques shown in FIGS. 3A-D.

In some implementations, a system can be configured to receive, from a SAN device, data describing a first set of logical units of the SAN device, the first set of logical units together representing a total quantity of logical data storage that is greater than a total quantity of physical data storage available on the SAN device, where at least some pages of the first set of logical units are not allocated to the physical data storage. As described above, this information can include, for example, information that describes the storage capacity of the logical unit, the identity of data stored on the logical unit (e.g., blocks, or portions, of data that are stored on the logical unit), the location of the data stored on the logical unit (e.g., the particular pages of the logical unit that store particular blocks of data), the location of free space on the logical unit (e.g., the location of pages of the logical unit that do not contain any data), and so forth. This information can be received continuously, periodically, or intermittently.

The system can also be configured to present one or more second logical units to the host, wherein the second logical units correspond to one or more logical units of the first set of logical units. As an example, this can be performed as shown in FIG. 2, in which a set of logical units (e.g., the logical units 204a-d) are presented to the hosts 102a-d, where the logical units 204a-d correspond to the logical units 206a-d of the SAN device 106a. As described above, the first set of logical units can be logically mapped to the second logical units in a manner that redistributes the storage capacities of the first logical units.

The system can also be configured to receive, from the host, a request to write data to a particular second logical unit, where the request identifies a portion of data and a location of the particular second logical unit. This request can be similar to the example requests described above, for example the request 300 of FIG. 3A.

The system can also be configured to partition the particular portion of data into one or more blocks. Data can be partitioned, for example, using one or more of the techniques described above, for example the data partitioning technique shown in FIG. 3B.

The system can also be configured to create an index for the particular portion of data. This index can be similar to the indices described above, for example the index 316 shown in FIG. 3D. An index can contain, for each of the blocks, an identity of the block and a corresponding location field for storing the location of that block.

The system can also be configured to transmit, to the SAN device, a new request to write data, where the new request identifies at least one of the blocks and a location of the one or more logical units of the first set of logical units corresponding to the particular second logical unit specified by the request. This modified new request can be similar to the example modified new requests described above, for example the modified new request 310 of FIG. 3C. The new request can include an indication to the SAN device to write the at least one block to the logical unit by, at least in part, prioritizing the filling of pages of the logical unit, for example as described in reference to FIGS. 5A-B. In these cases, the number of pages that are not allocated might be greater than had the blocks been stored in a manner that did not prioritize the filling of pages, and thus could increase the amount of data that can be stored in the logical units of the SAN device.

The system can also be configured to record, for at least one of the blocks, the location of the block in the corresponding location field the index. Examples of recording location information for each block are described above, for example the description in reference to the index 316 of FIG. 3D.

In the examples above, data is deduplicated in a manner that fully eliminates duplicative blocks. However, this need not be the case. In some implementations, data can be deduplicated in a manner that generally reduces the number of duplicative blocks, but not in a manner that necessitates fully eliminating all duplicative blocks. Thus, in some implementations, even after data is deduplicated and written to a logical unit, some duplicative blocks might still exist within that logical unit.

In the examples above, systems are described as having certain devices interconnected with certain other devices (e.g., the system 100 of FIG. 1 and the system 200 of FIG. 2). Similarly, example implementations are described as having certain devices situated between certain other devices, such that the intermediate device manages data and data-related requests between the other devices. However, these arrangements are intended only as conceptual examples. In practice, the devices of a system need not be arranged in any specific physical arrangement, and need not be specifically interconnected in the manner shown in these examples. For instance, in practice the interconnection of devices can be implemented using one or more networks in which some or all of the devices of the network can communicate with some or all of the other devices in the network.

Figure 7:
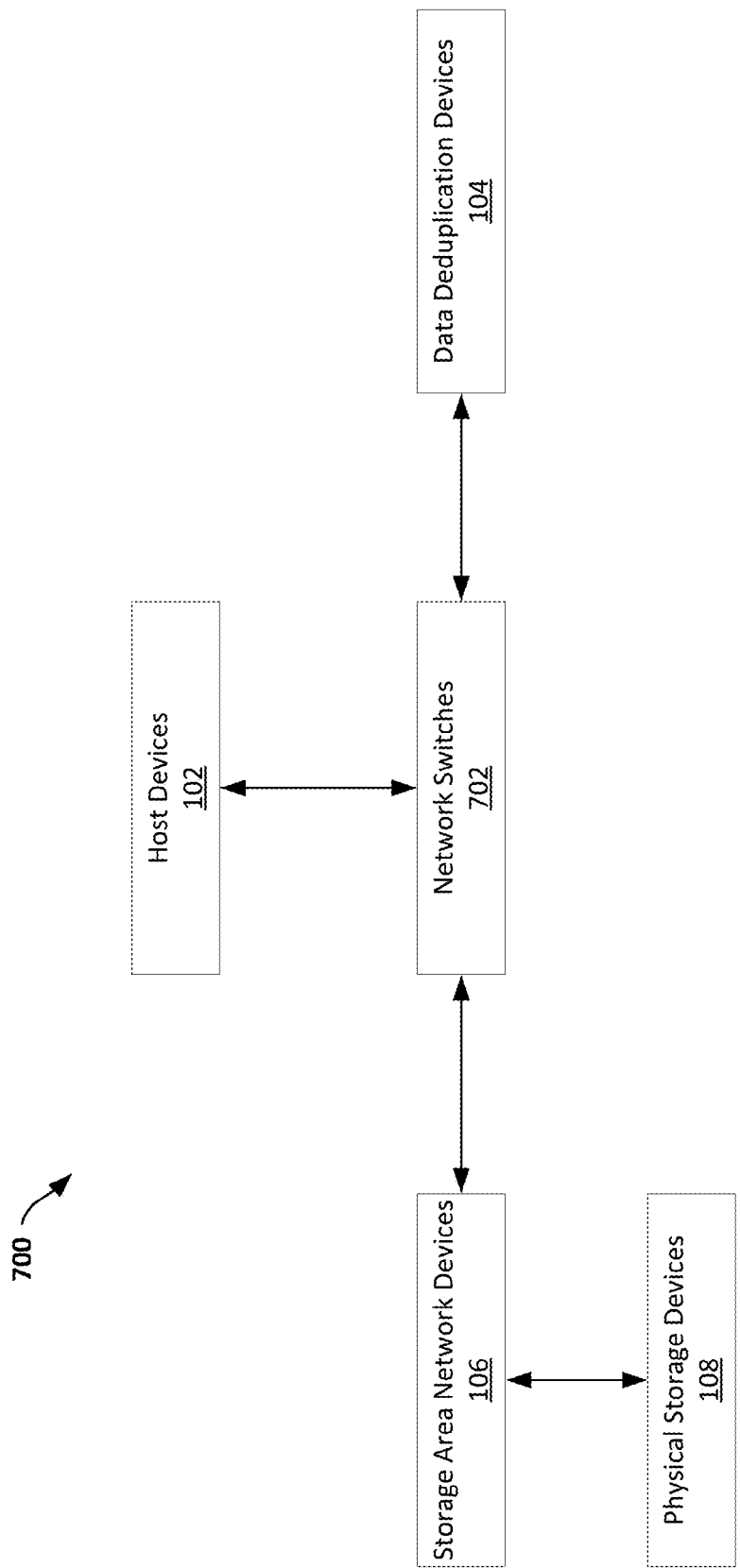
FIG. 7 is a block diagram of a system that includes one or more host devices, one or more data deduplication devices, one or more SAN devices, and one or more physical storage devices interconnected through one or more network switches.

As an example, as shown in FIG. 7, a system 700 can include one or more host devices 102, one or more data deduplication devices 104, one or more SAN devices 106, and one or more physical storage devices 108. In this example, the host devices 102, the data deduplication devices 104, and the SAN devices 106 are interconnected through one or more network switches 702, forming a network between these devices. In this manner, each of the devices of this network can transmit data to and receive data from any of the other devices of the network. In these implementations, data deduplication devices 104 can still be used to manage data and data-related requests between the host devices 102 and the SAN devices 106. For example, in some implementations, host devices 102 can be configured to transmit data and data-related requests to the data deduplication devices 104, instead of to the SAN devices 106. As another example, in some implementations, the network switches 702 can be configured to reroute data and data-related requests between the host devices 102 and the SAN devices 106 to the data deduplication devices 104 instead. Similar techniques can be used to reroute any other data and data-related requests between any of the devices of a network.

FIG. 8 is a block diagram of an example computer system 800. For example, referring to FIG. 1, host devices 102, data deduplication devices 104, SAN devices 106, and physical storage devices 108 could be an example of the system 700 described here, as could a computer system used by any of the users who access resources of host devices 102, data deduplication devices 104, SAN devices 106, or physical storage devices 108. The system 800 includes a processor 810, a memory 820, a storage device 830, and an input/output device 840. Each of the components 810, 820, 830, and 840 can be interconnected, for example, using a system bus 850. The processor 810 is capable of processing instructions for execution within the system 800. In some implementations, the processor 810 is a single-threaded processor. In some implementations, the processor 810 is a multi-threaded processor. In some implementations, the processor 810 is a quantum computer. The processor 810 is capable of processing instructions stored in the memory 820 or on the storage device 830. The processor 810 may execute operations such as storing, maintaining, and displaying artifacts.

The memory 820 stores information within the system 800. In some implementations, the memory 820 is a computer-readable medium. In some implementations, the memory 820 is a volatile memory unit. In some implementations, the memory 820 is a non-volatile memory unit.

The storage device 830 is capable of providing mass storage for the system 800. In some implementations, the storage device 830 is a non-transitory computer-readable medium. In various different implementations, the storage device 830 can include, for example, a hard disk device, an optical disk device, a solid-state drive, a flash drive, magnetic tape, or some other large capacity storage device. In some implementations, the storage device 830 may be a cloud storage device, e.g., a logical storage device including multiple physical storage devices distributed on a network and accessed using a network. In some examples, the storage device may store long-term data. The input/output device 840 provides input/output operations for the system 800. In some implementations, the input/output device 840 can include one or more of a network interface devices, e.g., an Ethernet card, a serial communication device, e.g., an RS-232 port, and/or a wireless interface device, e.g., an 802.11 card, a 3G wireless modem, a 4G wireless modem, etc. A network interface device allows the system 800 to communicate, for example, transmit and receive data. In some implementations, the input/output device can include driver devices configured to receive input data and send output data to other input/output devices, e.g., a keyboard, a mouse, a printer, a sensor (e.g., a sensor that measures component or system-related properties, a sensor that measures environmental-related properties, or other types of sensors), and a display device 860. In some implementations, mobile computing devices, mobile communication devices, and other devices can be used.

A computing system can be realized by instructions that upon execution cause one or more processing devices to carry out the processes and functions described above, for example, storing, maintaining, and displaying artifacts. Such instructions can include, for example, interpreted instructions such as script instructions, or executable code, or other instructions stored in a computer readable medium. A computing system can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

Although an example processing system has been described in FIG. 7, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification, such as storing, maintaining, and displaying artifacts can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, a composition of matter effecting a machine readable propagated signal, or a combination of one or more of them.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server is a general purpose computer, and sometimes it is a custom-tailored special purpose electronic device, and sometimes it is a combination of these things. Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

Certain features that are described above in the context of separate implementations can also be implemented in combination in a single implementation. Conversely, features that are described in the context of a single implementation can be implemented in multiple implementations separately or in any sub-combinations.

The order in which operations are performed as described above can be altered. In certain circumstances, multitasking and parallel processing may be advantageous. The separation of system components in the implementations described above should not be understood as requiring such separation.

Other implementations are within the scope of the following claims.

What is claimed is:

1. A system for managing data-related requests between a host and a storage area network (SAN) device, the system configured to:
   receive data describing a first set of logical units of the SAN device, the first set of logical units together representing a total quantity of logical data storage that is greater than a total quantity of physical data storage available on the SAN device, where at least some pages of the first set of logical units are not allocated to the physical data storage;
   present one or more second logical units to the host, wherein the second logical units correspond to one or more logical units of the first set of logical units;
   receive, from the host, a request to write data to a particular second logical unit, where the request identifies a particular portion of data and a location of the particular second logical unit;
   partition the particular portion of data into one or more blocks;
   create an index for the particular portion of data, the index comprising, for each of the blocks, an identity of the block and a corresponding location field;
   identify, from among the blocks, at least one duplicative block that is already stored in the physical data storage but stored at a location other than the location specified by the request, and in response,
      record, for each of the duplicative blocks, the other location that already stores the block in the corresponding location field of the index, and
   transmit, to the SAN device, a new request to write data, where the new request identifies the non-duplicative blocks and a location of the one or more logical units of the first set of logical units corresponding to the particular second logical unit specified by the request, and where the new request comprises an indication to the SAN device to write the non-duplicative blocks by, at least in part, prioritizing writing the non-duplicative blocks to partially filled pages of the first set of logical units over empty pages of the first set of logical units; and
   record, for each of the non-duplicative blocks, the location of the block in the corresponding location field of the index.

2. The system of claim 1, wherein the system is configured to generate the new request based on a strategy for increasing an amount of data that can be stored on the SAN device.

3. The system of claim 2, wherein the strategy is based on the data describing logical units of the SAN device.

4. The system of claim 2, wherein the strategy is based on a determination that, if the new request does not include duplicative blocks, the quantity of pages of the logical units not allocated to the physical data storage can be increased.

5. The system of claim 1, wherein prioritizing writing the non-duplicative blocks to partially filled pages of the first set of logical units over empty pages of the first set of logical units comprises, when writing data to a page, selecting a page that already contains data instead of selecting a page that does not already contain data.

6. The system of claim 1, wherein the system is configured to compress the particular portion of data after partitioning the particular portion of data into one or more blocks.

7. The system of claim 1, wherein data describing a first set of logical units of the SAN device is received from the SAN device.

8. A data deduplication device configured for:
   receiving data describing logical units of a storage area network (SAN) device, the logical units together representing a total quantity of logical data storage that is greater than a total quantity of physical data storage available on the SAN device, where at least some pages of the logical units are not allocated to the physical data storage;
   receiving requests to write data to the SAN device, where each request identifies a particular location of one of the logical units;
   increasing a quantity of the pages that are not allocated to the physical data storage by identifying, among the received requests, at least one request to write data that is already stored in the physical data storage but stored at a location other than the particular location specified by the request, and, in response, not storing the data as requested, but instead recording a pointer from the particular location specified by the request to the other location that already stores the data;

providing an indication to the SAN device to write data that is not already stored in the physical data storage by, at least in part, prioritizing writing the data that is not already stored in the physical data storage to partially filled pages of the logical units over empty pages of the logical units.

9. A method comprising:

receive data describing a first set of logical units of the SAN device, the first set of logical units together representing a total quantity of logical data storage that is greater than a total quantity of physical data storage available on the SAN device, where at least some pages of the first set of logical units are not allocated to the physical data storage;

present one or more second logical units to the host, wherein the second logical units correspond to one or more logical units of the first set of logical units;

receive, from the host, a request to write data to a particular second logical unit, where the request identifies a portion of data and a location of the particular second logical unit;

partition the particular portion of data into one or more blocks;

create an index for the particular portion of data, the index comprising, for each of the blocks, an identity of the block and a corresponding location field;

identify, from among the blocks, at least one duplicative block that is already stored in the physical data storage but stored at a location other than the location specified by the request, and in response, record, for each of the duplicative blocks, the other location that already stores the block in the corresponding location field of the index, and transmit, to the SAN device, a new request to write data, where the new request identifies the non-duplicative blocks and a location of the one or more logical units of the first set of logical units corresponding to the particular second logical unit specified by the request, and where the new request comprises an indication to the SAN device to write the non-duplicative blocks by, at least in part, prioritizing writing the non-duplicative blocks to partially filled pages of the first set of logical units over empty pages of the first set of logical units; and record, for each of the non-duplicative blocks, the location of the block in the corresponding location field of the index.

10. The method of claim 9, wherein the second logical units are presented to the host by a device that does not manage a over-provisioning capability of the SAN device.

11. A system for managing data-related requests between a host and a storage area network (SAN) device, the system configured to:

receive data describing a first set of logical units of the SAN device, the first set of logical units together representing a total quantity of logical data storage that is greater than a total quantity of physical data storage available on the SAN device, where at least some pages of the first set of logical units are not allocated to the physical data storage;

present one or more second logical units to the host, wherein the second logical units correspond to one or more logical units of the first set of logical units;

receive, from the host, a request to write data to a particular second logical unit, where the request identifies a particular portion of data and a location of the particular second logical unit;

partition the particular portion of data into one or more blocks;

create an index for the particular portion of data, the index comprising, for each of the blocks, an identity of the block and a corresponding location field;

transmit, to the SAN device, a new request to write data, where the new request identifies at least one of the blocks and a location of the one or more logical units of the first set of logical units corresponding to the particular second logical unit specified by the request, and where the new request comprises an indication to the SAN device to write the at least one block by, at least in part, prioritizing writing the at least one block to a partially filled page of the first set of logical units over an empty page of the first set of logical units; and record, for at least one of the blocks, the location of the block in the corresponding location field of the index.

12. The system of claim 11, wherein the system is configured to generate the new request based on a strategy for increasing an amount of data that can be stored on the SAN device.

13. The system of claim 12, wherein the strategy is based on the data describing logical units of the SAN device.

14. The system of claim 12, wherein the strategy is based on a determination that, if the new request does not include duplicative blocks, the quantity of pages of the logical units not allocated to the physical data storage can be increased.

15. The system of claim 11, wherein prioritizing writing the non-duplicative blocks to partially filled pages of the first set of logical units over empty pages of the first set of logical units comprises, when writing data to a page, selecting a page that already contains data instead of selecting a page that does not already contain data.

16. The system of claim 11, wherein the system is configured to compress the particular portion of data after partitioning the particular portion of data into one or more blocks.

17. The system of claim 11, wherein data describing a first set of logical units of the SAN device is received from the SAN device.

* * * * *